Feb. 9, 1971  E. N. KOSTIELNEY, JR  3,561,255
LEAK TESTING APPARATUS
Filed Feb. 14, 1969
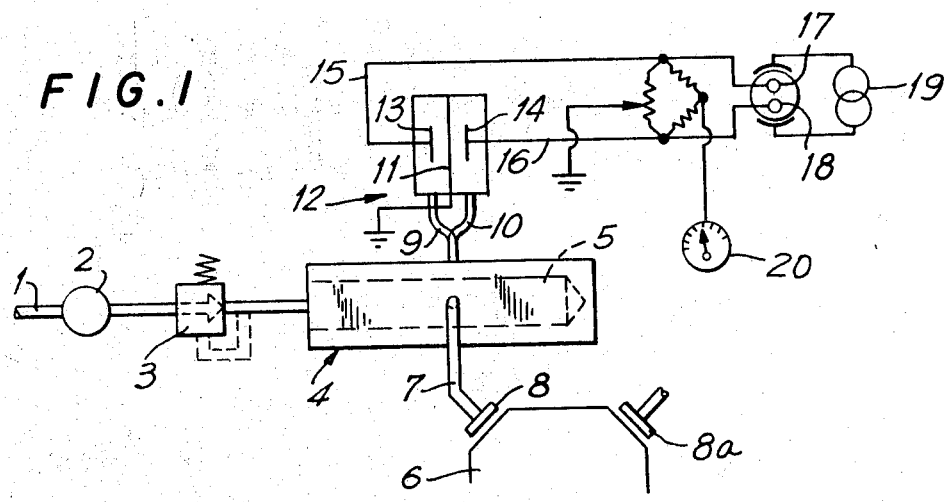
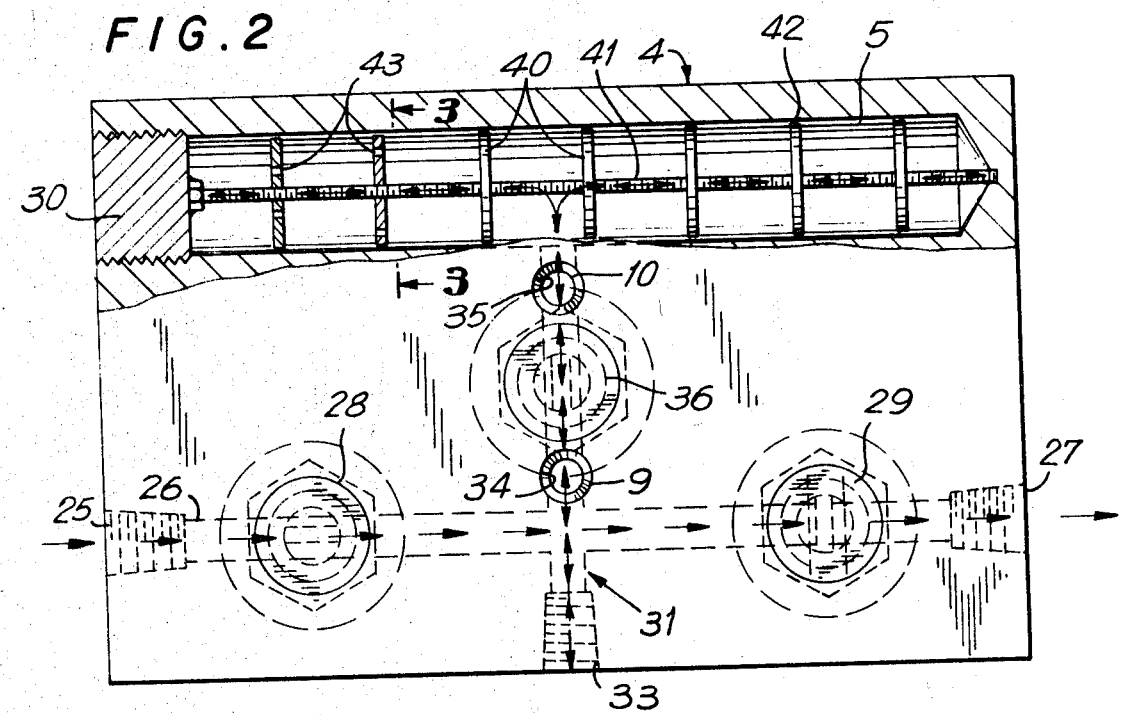
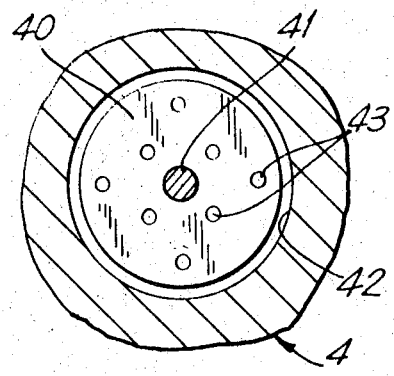
INVENTOR.
EDWARD N. KOSTIELNEY, Jr.
BY
Curtis, Morris & Safford
ATTORNEYS United States Patent Office 3,561,255
Patented Feb. 9, 1971

3,561,255
LEAK TESTING APPARATUS
Edward N. Kostielney, Jr., Taylor, Mich., assignor to Ajem Laboratories, Inc., Livonia, Mich.
Filed Feb. 14, 1969, Ser. No. 799,322
Int. Cl. G01m 3/26
U.S. Cl. 73—40                                    7 Claims

ABSTRACT OF THE DISCLOSURE

A leak testing device, commonly employed in testing automotive engine components and the like, which pressurizes the part to be tested and a standard chamber, separates the two, and then measures the difference in pressure over a given period of time between the part and the standard chamber.

The improvement in such a device reducing the time required for taking a reproduceable useful reading by incorporating baffles in the standard chamber which restrict the flow of testing fluid thereby reducing oscillation and hastening standard conditions, the baffles are preferably in the form of plates or discs spaced longitudinally of the ballast chamber with each having a space between its outer periphery and the wall of the chamber, or formed with perforations therein, or a combination of both.

---

The present invention relates to leak testing and more particularly to improvements in apparatus for testing parts, such as castings, for leaks.

A leak testing method and apparatus is described and claimed in the U.S. Letters Pat. No. 3,221,539 issued to Dewey M. Evans et al. on Dec. 7, 1965 which supplies a testing fluid simultaneously to the interior of a part to be tested and to a ballast chamber. After the pressure has become stabilized in the system, a divide valve is closed to segregate the ballast chamber from a chamber on one side of a wall of the part to be tested. The ballast chamber then becomes a standard for maintaining testing fluid at the initial pressure at which it was supplied to the part being tested. Any difference in pressure in the two chambers then shows that a leak exists in a wall of the part, and the magnitude of the difference in pressure over a given period of time indicates the size of the leak. Such differences in pressure for a predetermined period of time are then determined by a suitable measuring instrument which, in turn, actuates a responsive device to indicate a leak.

An improvement in the Evans et al. leak testing system is described and claimed in U.S. Letters Pats. 3,314,283 and 3,326,034 issued to Richard Thomas Fitzpatrick et al. on Apr. 18, 1967 and June 20, 1967, respectively. The improvements include, among other features, a manifold block of a heat conducting material, such as aluminum, which is located between the source of testing medium and part being tested and through which all testing medium flows to and from the parts to maintain the testing medium at a more uniform temperature. It has been found that the manifold block produces more uniform and reproducible test results in a shorter period of time than had theretofore been possible.

One of the objects of the present invention is to provide a further improvement in leak testing systems of the type indicated which further reduces the time required to test a part for leaks.

Another object is to provide an improved leak testing system which reduces the time required to attain a stabilized pressure in the system at which reproducible test results can be obtained.

Still another object is to provide an improved leak testing system of the type indicated which is of simple and compact construction to adapt it for economical manufacture and one which is reliable in operation.

These and other objects will become more apparent from the following description and drawing in which like reference characters denote like parts throughout the several views. It is to be expressly understood that the drawing is for the purpose of illustration only and is not a definition of the limits of the invention, reference being had for this purpose to the appended claims.

In the drawings:

FIG. 1 is a diagrammatic view of a leak testing system incorporating the novel features of the present invention and showing the manifold block positioned between the source of testing fluid and the measuring instrument and chamber of the part being tested;

FIG. 2 is an enlarged plan view of the manifold block partly in section and showing the baffles in the ballast chamber for reducing the time required to produce a stabilized pressure prior to testing for a leak;

FIG. 3 is a transverse sectional view taken on line 3—3 of FIG. 2 to show the spacing of the periphery of the baffles from the interior of the ballast chamber and the holes in the baffles for restricting flow of the testing fluid; and FIG. 4 is a view similar to FIG. 3 showing a modified construction in which the peripheries of the baffles are joined to the wall of the ballast chamber and have a larger number of perforations for restricting flow.

In general the improvement constituting the subject matter of the present invention comprises the provision of baffles in the ballast chamber. While other forms of baffles may be used, the baffles are preferably in the form of plates or discs spaced longitudinally of the ballast chamber with each having a space between its outer periphery and the wall of the chamber, or formed with perforations therein, or a combination of both.

It is believed that the baffles restrict the flow of testing fluid along the ballast chamber and reduce oscillation of the fluid with resulting pressure gradients in the chamber as well as produce a more rapid transfer of heat between the baffles and walls of the chamber and thereby maintain a more uniform temperature of testing fluid in the system. Whatever the reason for the improvement, it has been found that the provision of baffles in the ballast chamber permits leak tests to be performed with reproducible results in a shorter period of time than is possible with the same system and ballast chamber without baffles therein.

Referring now to the drawings, the present invention is shown applied to a leak-testing system as shown in FIG. 1 which is generally similar to those described in the patents referred to above. Test fluid under pressure is supplied from a source through a conduit 1 having a filter 2 and pressure regulator 3 therein to supply testing fluid to the manifold block 4 at a predetermined pressure. Compressed air is usually used as the testing fluid but other gas and even liquid may be used. Test fluid supplied to the manifold 4 then flows simultaneously to a ballast chamber 5 in the manifold block 4 and the chamber in the part 6 to be tested. In the illustrated embodiment the part 6 to be tested is an engine block and the test fluid is supplied from the manifold block 4 to the interior of the cylinders through a flexible connection 7 having a closure 8 at its end for closing one side of the block. A similar closure 8a is provided for closing the opposite side of the block 4.

Conduits 9 and 10 extend upwardly from the top of the manifold 4 as viewed in FIG. 1 and are connected to the opposite sides of the diaphragm 11 of a measuring instrument 12 like that shown and described in the Fitzpatrick et al. Pat. Nos. 3,314,283 and 3,326,034. Suffice it to state herein that capacitor plates 13 and 14 at opposite sides of the diaphragm 11 are connected through line conductors 15 and 16 to electrodes 17 and 18 in an envelope containing a gas ionized by an oscillating generator 19. The generator 19 ionizes the gas between the electrodes 17 and 18 and the space between plates 13 and 14 and the diaphragm constitute capacitors. When the diaphragm 11 is centrally positioned between the plates the latter are equally charged. However, if the diaphragm moves to the left in FIG. 1 due to a leak in the part 2 being tested, the plate 13 becomes more highly charged than the plate 14. This difference in charge on the electrodes 17 and 18 produces a transient voltage through the ionized gas directly proportional to the degree of displacement of the diphragm 11 which, in turn, is directly proportional to the difference in pressure in the ballast chamber 5 and the part 6 being tested. The measuring instrument also includes meter 20 which measures this transient voltage through suitable electronic equipment, as shown and described in detail in the Fitzpatrick et al. patents, referred to above.

The manifold block 5 is shown in detail in FIG. 2 as having an inlet port 25 at one end of a passage 26 formed by drilling a hole through the block. The opposite end of the passage 26 terminates in an exhaust port 27 for dumping testing fluid from the system. The flow of testing fluid into the manifold block 5 is controlled by fill valve 28, and the exhaust of testing fluid from the block is controlled by a dump valve 29.

As shown most clearly in FIG. 2, the ballast chamber 5 is formed by a hole bored in the manifold block 4 and closed at the open end by a closure plug 30. The passage 26 is connected to the ballast chamber 5 and flexible conduit 7 to the part 6 by a second passage 31 formed by drilling a hole through the block and intersecting the passage 26 at right angles thereto. The inner end of passage 31 opens into the ballast chamber 5 midway between its ends and the other end of the passage 31 forms a port 33 for connection through the flexible conduit 7 to the part 6 being tested. In addition, spaced passages 34 and 35 are drilled through the top of the manifold 5 into the passage 31 and these passages are connected by the conduits 9 and 10 to the opposite sides of the diaphragm 11, as explained above. A divide valve 36 is provided in the passage 31 between the passages 34 and 35 so as to segregate the ballast chamber 5 from the remainder of the system including the chamber on the wall of the part being tested. As thus far described, the system is substantially identical with those described in the patents referred to above.

In accordance with the present invention a baffling arrangement is provided in the ballast chamber 5 to restrict the flow of testing fluid therealong. The baffles may take any suitable form and are constructed of a heat conducting material to increase the rate of heat transfer from the testing fluid tending to further equalize the temperature of the testing fluid in the system.

In the illustrated embodiment the baffles comprise a series of discs 40 arranged in spaced relation along an axially extending rod 41 supported at its ends in the ballast chamber 5. As stated above, the baffle discs 40 and supporting rod 41 are composed of a heat conducting material, such as aluminum, to transfer heat between them and the testing medium. Preferably, the discs are of slightly smaller diameter than the diameter of the ballast chamber 5 to provide an annular space 42 therebetween. The discs are also provided with the holes 43, and the annular space 42 between the periphery of the discs 40 and inside wall of the ballast chamber 5 together with the holes of the required size and number will restrict the flow of testing fluid along the chamber to produce the results desired. In some cases it is desirable to provide holes of different size in successive discs along the chamber so as to permit a greater flow through the first disc and gradually increase the restriction along the chamber toward its ends. One form of the invention now having been described in detail, the mode of operation is explained below.

To initiate a leak testing operation the manifold block 4 is connected through the flexible conduit to the chamber at one side of a wall of the part 6 being tested. Fill valve 28 and divide valve 36 are opened and exhaust valve 29 is closed as shown in FIG. 2. Testing fluid, such as compressed air, then flows from the source 1 through the filter 2 and pressure regulator 3 into the passage 26 in the manifold block 4 at a pressure of, for example, 29 p.s.i. The fluid under pressure flows simultaneously from passage 26 through the passage 31 into the ballast chamber 5 and through the flexible connection 7 to the chamber of the part 6 being tested. Testing fluid also flows through the passages 34 and 35 to the chambers at opposite sides of the diaphragm 11 in the pressure measuring instrument 12.

After sufficient testing fluid has been supplied to the system to produce a pressure therein approaching 29 p.s.i. the fill valve 28 is closed and the dump valve 29 opened to exhaust fluid from the system until the pressure is reduced to a value of, for example, 21 p.s.i., at which time the dump valve 29 is closed. When the pressure in the system has become stabilized, the divide valve 36 is closed to separate the ballast chamber 5 from the remainder of the system including the chamber in the part 6 being tested. Any difference in pressure between the chamber at the left-hand side of the diaphragm 11 of the measuring instrument 12 connected to the part 6 being tested through the conduit 9 and the chamber at the right-hand side of the diaphragm connected through the conduit 10 to the standard of ballast chamber 5 then indicates that a leak exists in the part. Such a difference in pressure flexes the diaphragm to the left as viewed in FIG. 1 and varies the capacitance between the diaphragm and the spaced capacitor plates 13 and 14. As the capacitor plates 13 and 14 are connected to the electrodes 17 and 18 in the chamber of gas ionized by the generator 19, the difference in capacitance will produce a transient direct current voltage between the electrodes directly proportional to the displacement of diaphragm 11 and size of the leak in the part being tested. This transient voltage and its magnitude are measured by meter 20 to indicate the leak and the size of the leak.

FIG. 4 shows a modified construction in which discs 40a like those illustrated in FIGS. 2 and 3 have substantially the same diameter as the cylindrical ballast chamber 5 and which may be attached thereto as by soldering. In this modified construction a greater number of the holes 43a are provided to produce all of the restriction to the flow of testing fluid along the chamber.

During the filling and dumping steps the testing fluid may have different gradients of pressure in different parts of the system, due to the flow into and from the system. But the pressure has to become stabilized in all parts of the system before any reproducible test results can be obtained. Also the expansion and compression of the testing fluid produce a variation in its temperature with corresponding fluctuations in pressure requiring a relatively long time to reach stable equilibrium conditions where such reproducible test results may be obtained. The baffles 40 of the present invention prevent the oscillation of testing fluid in the ballast chamber 5 as well as an increased transfer of heat to and from the testing fluid to materially reduce the time required for stabilization and thereby the time required for testing a part. The following tests were made in the same testing apparatus without and with the baffle arrangement of the present invention in the standard or ballast chamber 5 for comparison and showing the improvement resulting from the present invention in reducing the time required to test a part for leaks.

In the first set of tests shown in the chart below, test fluid at 21 p.s.i. was supplied to a ballast chamber without the baffle arrangement of the present invention and with the following operating periods: fill time 1.25 seconds; stabilizing time 14.25 seconds; test time 5.50 seconds; and a total time of 21 seconds. The pressure in the ballast chamber was then measured in micro-amps, and with UF indicating underfill and OF indicating overfill, the lowest reading of ten tests was 1 micro-amp UF and the highest reading was 3 micro-amps UF, with an average of 2.1 micro-amps UF. The largest absolute variation in readings amounted to 2 micro-amps UF, and the largest variation from the average reading was 1.1 micro-amp UF. These tests correspond with previous test results found to be sufficiently uniform to indicate leaks in the part being tested.

When a part having a known leak of 10 cc. per minute was substituted for the previously tested part and all other conditions remained the same, six different tests produced the same reading of 15 micro-amps UF indicating a leak with uniform reproducible results.

A second set of ten tests was conducted under the same operating conditions except that the stabilizing time was reduced from 14.25 seconds to 8 seconds. The highest reading obtained under these conditions was 20 micro-amps, and the lowest reading was 6 micro-amps, with an average of 14.7 micro-amps. With these conditions the greatest absolute difference in pressure in the ten tests amounted to 14 micro-amps and the greatest variation from the average amounted to 8.7 micro-amps. Because of the great variation in the micro-amp readings which are as much or greater than those indicating a leak in the first set of tests, a longer stabilizing time than 8 seconds must be used to truly indicate a leak.

A third set of ten tests was conducted with the baffle arrangement of the present invention provided in the ballast chamber 5 and other conditions remaining the same as in the second set of tests including only an 8 seconds stabilizing time period. It was found that the greatest absolute difference in readings in the ten tests was 3 micro-amps UF, and the greatest variation from the average was 1.85 micro-amps UF, which is sufficiently close to indicate a leak condition from a no-leak condition. Four corresponding tests were made on a part having a leak rate of 10 cc./min., the same as with the first set of tests and readings were obtained in a range between 14 and 16 micro-amps UF.

A fourth set of ten tests was made with the same apparatus having the baffles of the present invention and varying from the third set of tests by allowing only 6 seconds for stabilization. With this series of ten tests, the greatest absolute difference in readings amounted to only 3 micro-amps UF, and the greatest variation from the average of 1.8 micro-amps UF was 2.2 micro-amps UF. Here, again, this range is well within the permissible limit to determine leaks in parts and far superior to the second set of tests where the variation without leaks was greater than the variation produced by leaks. Corresponding tests were made in comparison with the fourth set of readings on a part having a leak of 10 cc. per minute and readings in the range of from 12 to 15 micro-amps UF were obtained.

TESTS ON NO-LEAK PARTS

|  | Without baffles | | With baffles | |
| --- | --- | --- | --- | --- |
|  | First set | Second set | Third set | Fourth set |
| Air, p.s.i. | 21 | 21 | 21 | 2 |
| Fill, sec. | 1.25 | 1.25 | 1.25 | 1.25 |
| Stab, sec. | 14.25 | 8 | 8 | 6 |
| Test, sec. | 5.5 | 5.5 | 5.5 | 5.5 |
| Total | 21 | 14.75 | 14.75 | 12.75 |
| Test Number: | | | | |
| 1, micro amps UF | 2.5 | 20.0 | 2.0 | 2.0 |
| 2, micro amps UF | 2.0 | 12.0 | 2.0 | 4.0 |
| 3, micro amps UF | 2.0 | 17.0 | 1.0 | 1.0 |
| 4, micro amps UF | 1.0 | 18.0 | 2.0 | 1.0 |
| 5, micro amps UF | 1.0 | 18.0 | 2.0 | 2.0 |
| 6, micro amps UF | 1.0 | 6.0 | 0.0 | 1.0 |
| 7, micro amps UF | 2.0 | 9.0 | 2.0 | 2.0 |
| 8, micro amps UF | 2.5 | 14.0 | 2.5 | 1.0 |
| 9, micro amps UF | 3.0 | 14.0 | 3.0 | 2.0 |
| 10, micro amps UF | 3.0 | 19.0 | 2.0 | 2.0 |

TESTS ON PARTS WITH 10 CC./MIN. LEAK

| Test Number: | | | | |
| --- | --- | --- | --- | --- |
| 1, micro amps UF | 15.0 |  | 15.0 | 12.0 |
| 2, micro amps UF | 15.0 |  | 16.0 | 14.0 |
| 3, micro amps UF | 15.0 |  | 14.0 | 15.0 |
| 4, micro amps UF | 15.0 |  | 15.0 |  |
| 5, micro amps UF | 15.0 |  |  |  |
| 6, micro amps UF | 15.0 |  |  |  |

It will now be observed that the present invention provides an improvement in a leak testing system which reduces the time required to test a part for leaks. It will further be observed that the present invention provides an improved leak testing system which reduces the time required to obtain a stabilized pressure in the system at which reproducible test results can be obtained. It will further be observed that the present invention provides an improved leak testing system which is of simple and compact construction to adapt it for economical manufacture, and one which is reliable in operation.

While a single embodiment of the invention is herein illustrated and described, it will be understood that further changes may be made in the construction and arrangement of elements without departing from the spirit or scope of the invention. Therefore, without limitation in this respect, the invention is defined by the following claims:

1. In a leak testing apparatus of the type having a manifold block positioned between a source of testing fluid under pressure and a part to be tested and provided with a closed ballast chamber therein and an outlet port connected to the source of fluid under pressure, passages connecting the inlet port to the closed ballast chamber and part being tested including a single passage connected to the ballast chamber through which fluid passes into and out of the chamber, spaced passages between the inlet port and ballast chamber and connected to the opposite sides of a pressure responsive element of a measuring instrument and a valve in said single passage between said spaced passages to segregate the ballast chamber from the part being tested, the combination with said elements in a leak testing apparatus of baffles of a heat conducting material in the ballast chamber and so constructed and arranged as to restrict the free flow of testing fluid along the chamber.

2. A leak testing apparatus comprising a source of testing fluid under pressure, a part to be tested for leaks, a manifold block having a ballast chamber therein to contain a body of testing medium to be compared with a body of testing medium in the part to be tested and passages through which the testing medium flows including a single passage to the ballast chamber through which testing medium flows to and from the chamber, valve means for segregating the ballast chamber from the part being tested, a measuring instrument connected to measure any difference in pressure between the ballast chamber and part being tested, and baffle means of a heat conducting material in the ballast chamber cooperating with the walls of the chamber to restrict the free flow of testing fluid along the chamber and provide for heat transfer with the fluid whereby to reduce the time required to produce a stabilized pressure in the manifold block.

3. A leak testing apparatus comprising a source of testing fluid under pressure, a measuring instrument having a pressure responsive element, a part to be tested, a manifold block between the source of testing fluid and part being tested, said manifold block having a ballast chamber therein with a single port opening at the center thereof, and passages connecting the source of testing fluid to the ballast chamber and part being tested and including a passage connected to the central port opening in the ballast chamber through which testing fluid flows to and from the chamber, said testing fluid flowing from the inlet passage at the center toward the opposite ends of the ballast chamber, spaced passages connecting the passage to the ballast chamber to the pressure responsive element of the measuring instrument, a valve in said passage between said spaced passages, and baffle means of a heat conducting material in said ballast chamber to restrict flow of testing fluid along said chamber and provide for heat transfer with the testing fluid.

4. A leak testing apparatus in accordance with claim 3 in which the baffle means comprises spaced plates of a heat conducting material.

5. A leak testing apparatus in accordance with claim 3 in which the ballast chamber in the manifold block is of cylindrical form, and the baffle means are in the form of discs mounted in spaced relation on an axial rod to position their periphery in spaced relation to the cylindrical wall of the chamber.

6. A leak testing apparatus in accordance with claim 3 in which the ballast chamber in the manifold block is of cylindrical form and the baffle means are discs mounted in spaced relation on an axial supporting rod in the ballast chamber, said discs having their periphery spaced from the cylindrical wall of the ballast chamber and said discs having perforations therein.

7. A leak testing apparatus in accordance with claim 3 in which the baffle means are in the form of plates spaced along the ballast chamber with their periphery attached to the peripheral wall of the chamber, and said plates having perforations therein to restrict the flow of testing medium along the chamber.

References Cited
UNITED STATES PATENTS

| | | | |
|---|---|---|---|
| 814,604 | 3/1906 | Hillis | 138—40 |
| 1,152,381 | 8/1915 | Kenney | 138—40 |
| 1,818,258 | 8/1931 | Isaacks | 73—392X |
| 3,314,283 | 4/1967 | Fitzpatrick et al. | 73—40 |
| 3,326,034 | 6/1967 | Fitzpatrick et al. | 73—40 |

LOUIS R. PRINCE, Primary Examiner

W. A. HENRY II, Assistant Examiner

U.S. Cl. X.R.

73—49.7, 392